United States Patent
Doshi

(10) Patent No.: US 7,690,002 B2
(45) Date of Patent: Mar. 30, 2010

(54) SYSTEM, METHOD, AND COMPUTER PROGRAM PRODUCT FOR SYSTEM EVENT NOTIFICATION AND TRACKING

(75) Inventor: Shreyas S. Doshi, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 822 days.

(21) Appl. No.: 11/247,703

(22) Filed: Oct. 11, 2005

(65) Prior Publication Data

US 2007/0083872 A1    Apr. 12, 2007

(51) Int. Cl.
    *G06F 3/00* (2006.01)
(52) U.S. Cl. ..................... 719/318
(58) Field of Classification Search ........... 719/318
    See application file for complete search history.

(56) References Cited

U.S. PATENT DOCUMENTS

| | | | |
|---|---|---|---|
| 6,167,448 A * | 12/2000 | Hemphill et al. | 709/224 |
| 6,275,855 B1 | 8/2001 | Johnson | |
| 6,687,749 B1 | 2/2004 | Chavez et al. | |
| 7,080,141 B1 * | 7/2006 | Baekelmans et al. | 709/224 |
| 7,376,733 B2 * | 5/2008 | Connelly et al. | 709/224 |
| 2004/0128583 A1 * | 7/2004 | Iulo et al. | 714/25 |
| 2004/0199828 A1 * | 10/2004 | Cabezas et al. | 714/39 |
| 2006/0143034 A1 * | 6/2006 | Rothermel et al. | 705/1 |
| 2006/0168591 A1 * | 7/2006 | Hunsinger et al. | 719/318 |

OTHER PUBLICATIONS

Notification Concerning Transmittal of International Preliminary Report on Patentability dated Apr. 24, 2008 in PCT Application No. PCT/US2006/035003.
Micromuse Netcool Solutions; "Netcool/OMNIbus Product Family—Realtime, End-to-End Event Management"; .micromuse.com (4 pgs).
Computer Associates "Unicenter Service Management for Enterprise Infrastructure Management" Computer Associates International, Inc. (2004) .ca.com (8 pgs).
Peregrine Systems "Service Center 6.1, Integrated ITIL-based Service Management", Peregrine Systems(2005), .peregrine. com (6 pgs).
BMCRemedy Service Management "Data Sheet—Remedy for IT Service Providers—Comprehensive IT Service Management for Outsourcers" BMC Software, Inc. (2005) .bmc.com (4 pgs).

* cited by examiner

*Primary Examiner*—Lechi Truong

(57) ABSTRACT

A method, and corresponding hardware and software implementations, including receiving an event notification; transmitting a supplemented event notification corresponding to the event notification to a first client data processing system; receiving event resolution data; transmitting the event resolution data to at least the first client data processing system; and storing the event resolution data and the supplemented event notification.

15 Claims, 3 Drawing Sheets

SYSTEM, METHOD, AND COMPUTER PROGRAM PRODUCT FOR SYSTEM EVENT NOTIFICATION AND TRACKING

TECHNICAL FIELD OF THE INVENTION

The present invention is directed, in general, to data processing system monitoring.

BACKGROUND OF THE INVENTION

An organization's information technology support staff are usually engaged on support tasks from incident handling or incident management systems. In most cases, this engagement is done by operations staff who are responsible for viewing events in the organization's infrastructure on event management system consoles.

Currently, there are no simple or seamless mechanisms to enable the support staff to communicate with the operations staff, say, to advise them of actions that may potentially impact the operational events view monitored by the operations staff. Consequently, this communication has to occur through asynchronous means such as email, phone call, instant messaging, etc. This asynchronous interaction is not only inconvenient and time-consuming but is also prone to errors.

It would be preferable for the operations staff, who will directly respond to the system issues, to receive as much relevant information as possible automatically, without requiring an additional contact to the support staff. There is, therefore, a need in the art for an improved system, method, and computer program product for system event notification and tracking.

SUMMARY OF THE INVENTION

To address the above-discussed deficiencies of the prior art, it is a primary object of the present invention to provide a system, method, and computer program product for managing and tracking system events and resolutions, including transmitting system events, the actions taken in response to the events, and expected events that will be caused by the actions taken.

According to various embodiments, there is disclosed a method, and corresponding hardware and software implementations, comprising receiving an event notification; transmitting a supplemented event notification corresponding to the event notification to a first client data processing system; receiving event resolution data; transmitting the event resolution data to at least the first client data processing system; and storing the event resolution data and the supplemented event notification.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
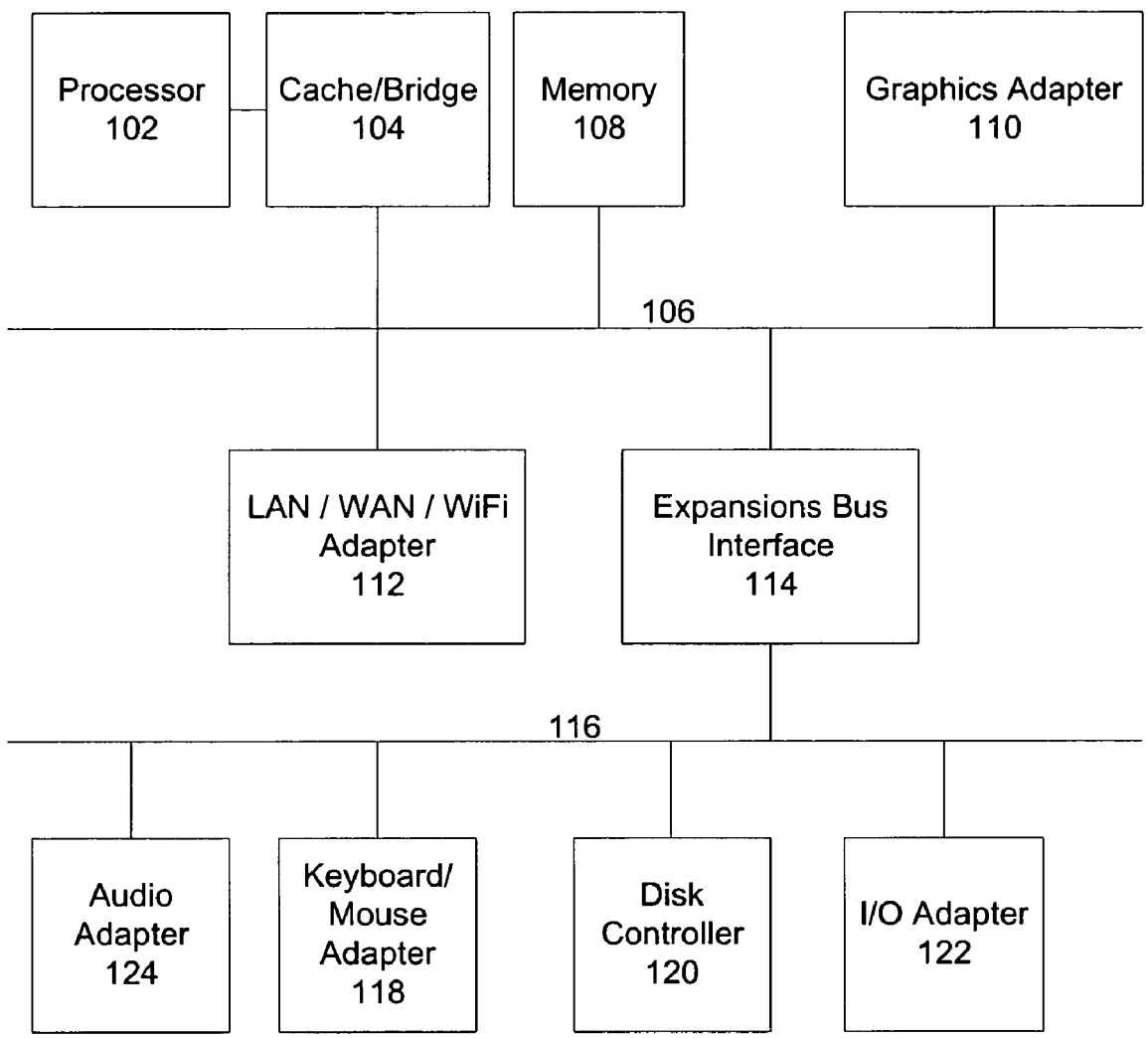
FIG. 1 depicts a block diagram of a data processing system in which a preferred embodiment can be implemented.
Figure 2:
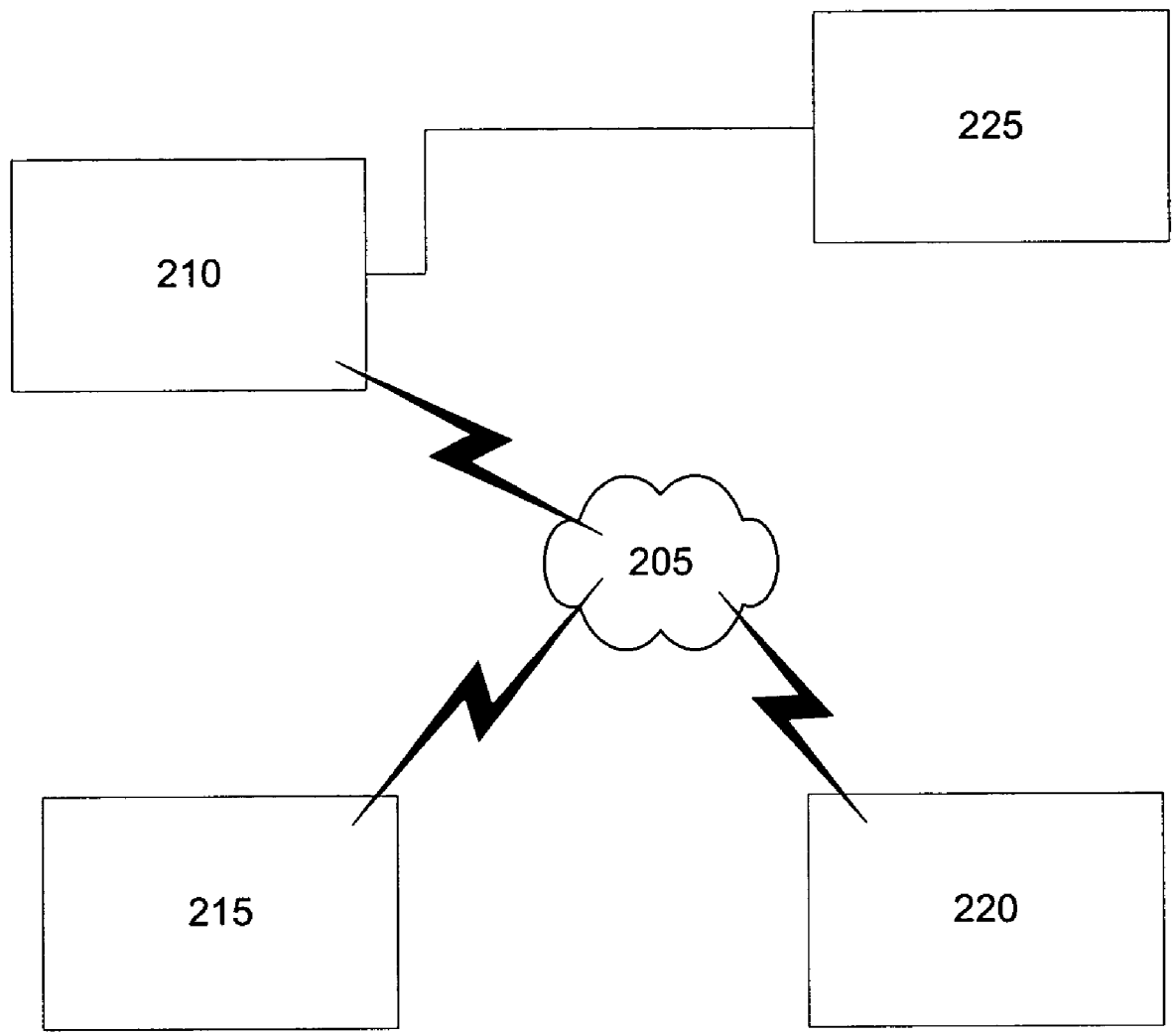
FIG. 2 depicts a block diagram of a data processing system network in which an embodiment of the present invention can be implemented.
Figure 3:
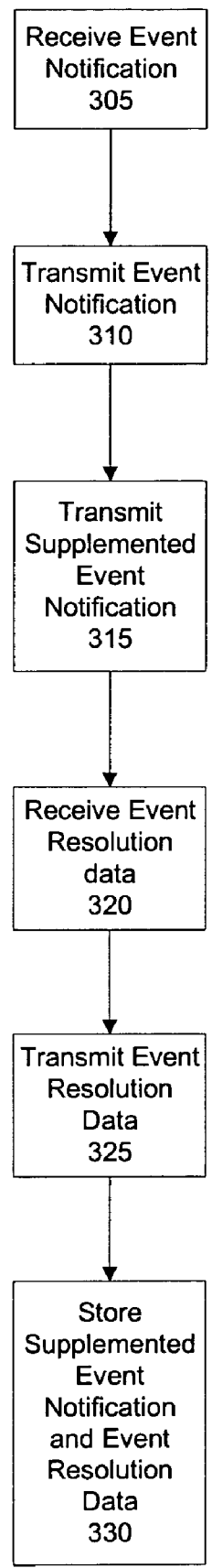
FIG. 3 depicts a flowchart of a process in accordance with a preferred embodiment.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Various embodiments include a system, method, and computer program product for managing and tracking system events and resolutions, including transmitting system events, the actions taken in response to the events, and expected events that will be caused by the actions taken.

To provide context for the system and methods disclosed herein, both a hardware context and overall system context are described below. Following that is a more detailed description of the specific functions, structures, and other details of the disclosed embodiments FIG. 1 depicts a block diagram of a data processing system in which a preferred embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present invention as described.

FIG. 2 depicts a block diagram of a data processing system network in which an embodiment of the present invention can be implemented. In this figure, network 205 is any known type of computer network, including private networks or public networks such as the internet. While network 205 is shown in only one instance here; as known to those of skill in the art, network 205 can be implemented in multiple separate networks, or in the same public or private network system. Of course, any data or network communication described herein can be implemented using any known data communications means, such as via telephone modem, xDSL, fiber optic, wireless, etc., or public or private networks. These communications can include data pertaining to user applications, server processes, system event management, and others, as described herein.

Server 210 is shown communicating client systems 215/220 via network 205. Server system 210 is a data processing system server, configured to communicate with multiple different client systems, including client systems 215/220 and others.

Server 210 also communicates with monitoring infrastructure 225, via any suitable means. Various monitoring infrastructure and systems are known to those of skill in the art, and will vary with implementation. In a preferred embodiment, monitoring infrastructure 225 automatically monitors a target system or systems for various system events, and notifies server 210 when an event occurs. What constitutes an "event" may vary in each implementation, as known to those of skill in the art.

It is understood that client systems 215/220, monitoring infrastructure 225, and server system 210 may be co-located or placed at different locations, or be otherwise structured as known to those of skill in the art, so long as they are capable of together performing the functions described and claimed herein.

As described herein, one or more of the data processing systems depicted in FIG. 2, whether client or server systems, can be configured to operate an event notification system as described herein, although the exemplary embodiment below describes this system as operating on server 210. Further, one or more of the data processing system depicted in FIG. 2 can also be the system described below as having the event that is monitored by the monitoring infrastructure 210.

The communications between systems can be made in any known fashion, and in one embodiment, utilize standard markup-language communications, as known to those of skill in the art.

Preferred embodiments include a system, method, and computer program product enables support staff to send notifications or information to operations event views regarding system events. Generally, a support staff member working on an incident can send a message directly over the data processing system network from an incident view within the incident management system. The message shows up as an event or alert in the event management system display of the data processing system that is monitored by the operations staff. The information in the event may be used to forewarn the operations staff about support actions that may spawn more operations events in the near term. Upon receiving such advance information in their primary monitoring display, the operations staff becomes better equipped to handle events.

This arrangement eliminates mishandling of events that are a direct or indirect result of remedial actions taken by support staff. Where the solution to one issue will cause other expected event notifications, the system will indicate that such further event notifications are expected and do not indicate independent issues that must be addressed. For example, if a system or service "hangs" and must be restarted, upon restart, other event notifications are typically generated indicating that system or service was restarted, and sent from a server system to one or more data processing systems. In a notification system in accordance with disclosed embodiments, the support and operations staff that the restart and associated notices are expected, so they are not treated as a separate event(s).

As described below, the disclosed event management system is preferably executed on a server data processing system that can be accessed by a plurality of other data processing systems. In a typical implementation, a member of the "support" staff will operated a first client data processing system, and a member of the "operations" staff will operate a second client data processing system. Of course, depending on the implementation, one or another data processing system can function as both a client data processing system and the server data processing system.

Event management systems, in general, are well known to those of skill in the art. As such, the complete operation of an event management system need not be described here to enable one of skill in the art to make and use the claimed invention. Described herein are various unique features and operations of an event management system in accordance with disclosed embodiments.

FIG. 3 depicts a flowchart of a process in accordance with a preferred embodiment. Suitable means in a data processing system can implement the process, and computer-executable instructions to perform the process can be stored in a machine-usable medium.

Here, the event management system first receives an event notification of a system event (step 305). This event notification can be received as an automatically-generated notification from monitoring infrastructure 225, manually entered by a user such as support staff, or a combination of these. E.g., the original notification may be automatically generated, then is supplemented with additional information from a user, or vice versa.

This notification preferably identifies at least the nature of the event, the time/date of the event, and the systems affected by the event. Additional information, such as a recommended resolution or other information, can also be included. The event management system transmits the event notification to a first client data processing system for display to the support user (step 310), and optionally also to other data processing systems. Of course, if the support user has entered all or part of the notification event information, then the event notification may be sent to the first data processing system, all or in part, before, during, and after the support user enters data.

Next, after receiving any additional data, the event management system transmits a supplemented event notification to a second client data processing system, which in this example is used by operations staff (step 315). The operations staff can then view the notification on the second data processing system. The supplemented event notification corresponds to the original event notification, including any additional information added by the system or the support user. In some cases, there will be no additional information, and the supplemented event notification will be substantially identical to the original event notification.

Next, the event management system receives event resolution data (step 320). The event resolution data is preferably received from whatever data processing system is used by the person(s) resolving the issue described in the event notification (e.g., the support user), or if the issue is automatically resolved, by the data processing system initiating the resolution.

The event resolution data is transmitted to one or more data processing systems (step 325), to be displayed to relevant users such as support or operations staff. The supplemented event resolution data and event notification are stored by the event management system (step 330).

The event resolution data preferably includes the action taken to resolve the issue, and a description of any further events that may occur because of the action taken, generically referred to herein as "expected events." For example, if the event notification indicates that a service has stalled on a given system, the proper resolution may be to re-start that system. Assuming that a support user is initiating the re-start, the support user will enter event resolution data indicating that the given system will be restarted. Further, the support user will indicate that, because the system is being restarted, additional event notifications may be received indicating that the system has been restarted. By including this information, other users can see that the secondary event notifications related to an expected event, and no action may have to be taken.

In some embodiments or implementations, some or all of the steps above can be performed at the same or substantially the same time. For example, the support user may enter, and the event management system receive, the event data and the resolution data at the same time, and the event data, the supplemented event data, and the resolution data are all transmitted together. This could occur, for example, where the support user receives a telephone call from a customer reporting a problem. In one process, he enters into the event management system a description of the problem (the event data), and the actions taken to resolve the problem (the resolution data). The system adds additional information (such as a timestamp) to the event data to produce the supplemented event data, and both the supplemented event data and the resolution data are sent to the operations team. Operations, seeing the supplemented event data and the resolution data, can determine what subsequent events are expected to occur, and take (or not take) any appropriate steps in response. Of course, as described, the resolution data can explicitly include any expected events.

In alternate embodiments, each event has a corresponding event code, which is included in the event notification. The event resolution data can include a list of event codes for other events that are expected to occur because of the action taken to resolve the first issue. The event notification system can then identify when the expected event notifications have been received, by comparing the event codes, and either suppress the event notification entirely or amend the event notification to indicate that the event was expected.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of the disclosed data processing systems may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of medium utilized to actually carry out the distribution. Examples of machine usable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for managing system events, comprising:
   receiving, with a data processing system, an event notification, the event notification identifying at least nature of an event, a time and date of the event, and systems affected by the event;
   transmitting the event notification to a first client data processing system;
   transmitting a supplemented event notification corresponding to the event notification to a second client data processing system, wherein the supplemented event notification is configured to include a recommended resolution;

receiving, with the data processing system, event resolution data from the first client data processing system for resolving issues from the event notification in accordance with the event resolution data, the event notification, and the supplemented event notification, wherein the event resolution data includes an action taken to resolve an issue causing the event, and a description of any further events that occur because of the action taken;

transmitting the event resolution data to at least the second client data processing system; and storing, with the data processing system, the event resolution data and the supplemented event notification; and compare the event notification data to a previously received expected event indicated in previously received event resolution data to identify an expected event within the event notification.

2. The method of claim 1, wherein the event resolution data includes at least one expected event.

3. The method of claim 1, wherein the event notification includes an event code.

4. The method of claim 1, wherein the event notification is received from a user.

5. The method of claim 1, wherein the supplemented event notification includes data received from a user and data received from a monitoring infrastructure.

6. A data processing system comprising a processor and accessible memory, the data processing system for managing system events configured to:

receive an event notification, the event notification identifying at least nature of an event, a time and date of the event, and systems affected by the event;

transmit the event notification to a first client data processing system;

transmit a supplemented event notification corresponding to the event notification to a second client data processing system, wherein the supplemented event notification is configured to include a recommended resolution;

receive event resolution data from the first client data processing system for resolving issues from the event notification in accordance with the event resolution data, the event notification, and the supplemented event notification, wherein the event resolution data includes an action taken to resolve an issue causing the event, and a description of any further events that occur because of the action taken;

transmit the event resolution data to at least the second client data processing system;

store the event resolution data and the supplemented event notification; and compare the event notification to a previously received expected event indicated in previously received event resolution data to identify an expected event within the event notification.

7. The data processing system of claim 6, wherein the event resolution data includes at least one expected event.

8. The data processing system of claim 6, wherein the event notification includes an event code.

9. The data processing system of claim 6, wherein the event notification is received from a user.

10. The data processing system of claim 6, wherein the supplemented event notification includes data received from a user and data received from a monitoring infrastructure.

11. A computer program product tangibly embodied in a machine-readable storage medium, comprising:

computer-executable instructions for receiving an event notification, the event notification identifying at least nature of the event, a time and data of the event, and systems affected by the event;

computer-executable instructions for transmitting the event notification to a first client data processing system;

computer-executable instructions for transmitting a supplemented event notification corresponding to the event notification to a second client data processing system, wherein the supplemented event notification is configured to include a recommended resolution;

computer-executable instructions for receiving event resolution data from the first client data processing system for resolving issues from the event notification in accordance with the event resolution data, the event notification, and the supplemented event notification, wherein the event resolution data includes an action taken to resolve an issue causing the event, and a description of any further events that occur because of the action taken;

computer-executable instructions for transmitting the event resolution data to at least the second client data processing system;

computer-executable instructions for storing the event resolution data and the supplemented event notification; and compare the event notification to a previously received expected event indicated in previously received event resolution data to identify an expected event within the event notification.

12. The computer program product of claim 11, wherein the event resolution data includes at least one expected event.

13. The computer program product of claim 11, wherein the event notification includes an event code.

14. The computer program product of claim 11, wherein the event notification is received from a user.

15. The computer program product of claim 11, wherein the supplemented event notification includes data received from a user and data received from a monitoring infrastructure.

* * * * *